July 23, 1968

J. L. ADAMS 3,393,922

CAMPER APPARATUS

Filed Oct. 22, 1965

INVENTOR
JAMES L. ADAMS
BY
Robert C. Baker
ATTORNEY

July 23, 1968
J. L. ADAMS
3,393,922
CAMPER APPARATUS
Filed Oct. 22, 1965
3 Sheets-Sheet 2
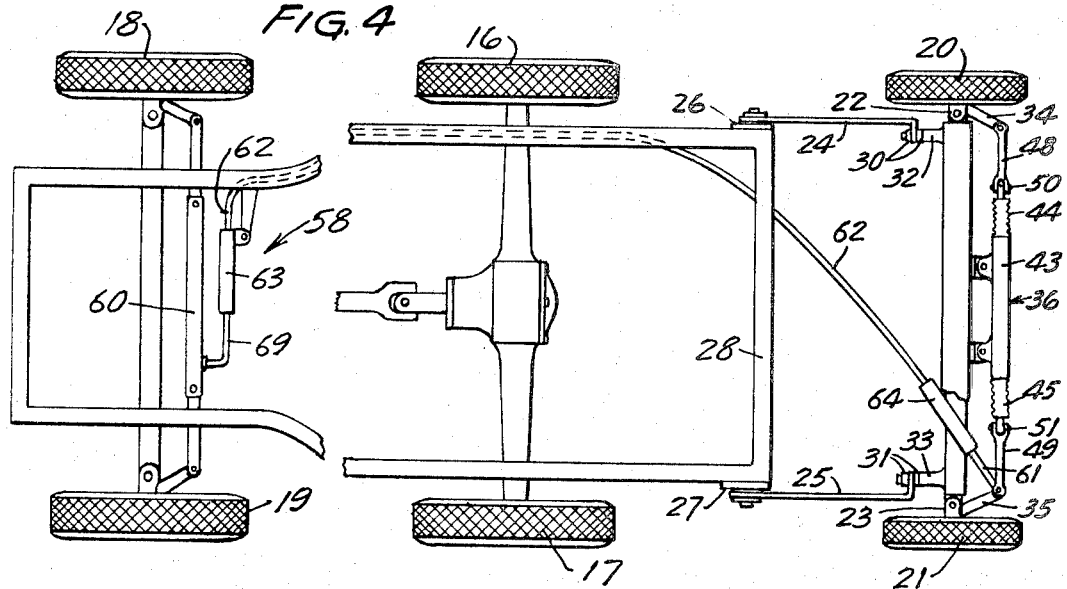
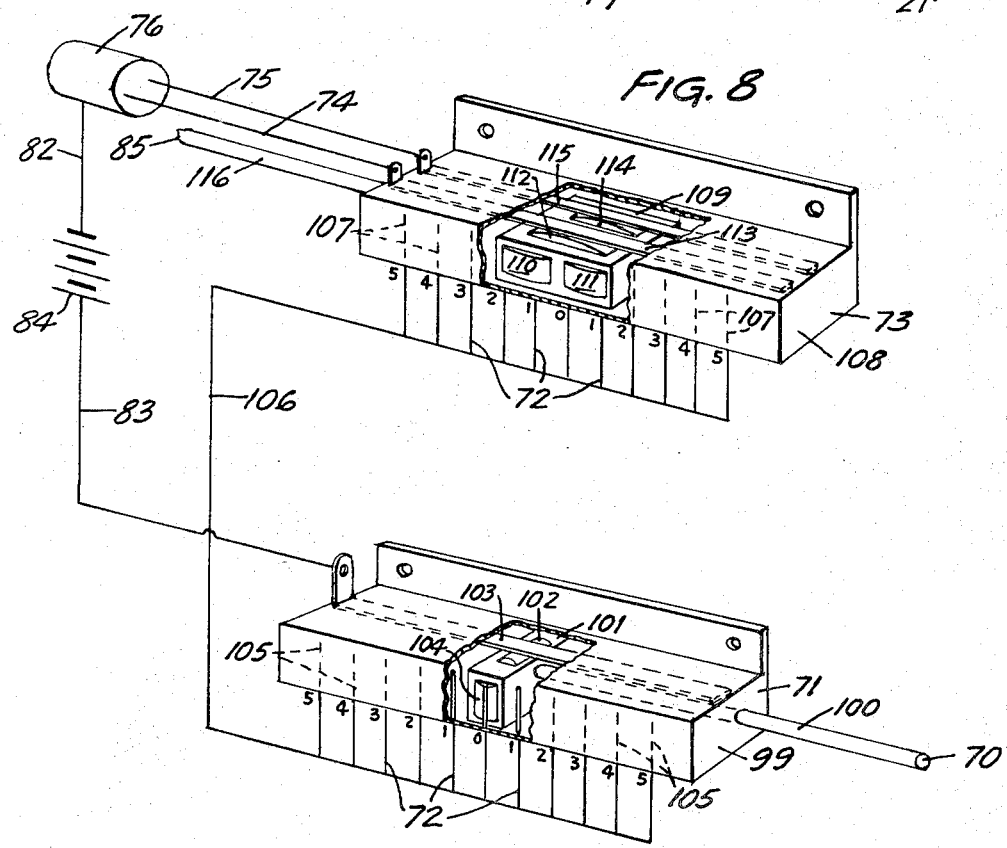
INVENTOR
JAMES L. ADAMS
ATTORNEY July 23, 1968

J. L. ADAMS 3,393,922

CAMPER APPARATUS

Filed Oct. 22, 1965

INVENTOR.
JAMES L. ADAMS
BY
Robert C. Baker
ATTORNEY

United States Patent Office 3,393,922
Patented July 23, 1968

3,393,922
CAMPER APPARATUS
James L. Adams, South St. Paul, Minn., assignor of one-fourth to Robert C. Baker, St. Paul, Minn.
Filed Oct. 22, 1965, Ser. No. 501,930
9 Claims. (Cl. 280—423)

ABSTRACT OF THE DISCLOSURE

A trailing support assembly having spaced support wheels carried on horizontally pivotable stub axles, and spring means located upon a tie rod arrangement between the mountings for the spaced support wheels to bias the support wheels toward a tracking nonpivoted relationship parallel to nonpivoting rear wheels of a self-propelled vehicle. Additionally electrical and hydraulic means are disclosed for positive horizontal pivoting of the support wheels.

---

This invention relates to new camper apparatus, particularly new apparatus or means for mounting a camper housing or an analogous component to a self-propelled vehicle such as a passenger automobile or a pickup styled vehicle. The invention is further directed to new apparatus or means for supporting the rear portion of a camper or analogous component. Still further, the invention is directed to new combinations of elements, particularly the combination including the new support means for a camper or analogous component, with and without the self-propelled vehicle as a part of the combination. Methods of accomplishing the new results taught herein are also within the scope and objects of the invention.

The new apparatus of this invention for supporting the rear portion of a camper or analogous component is a trailing support assembly. The trailing support assembly is capable of being affixed or hitched to the rear portion of the self-propelled vehicle. The self-propelled vehicle also serves as a support for the front end of the camper. Thus it serves only as a partial support for the camper. The rear of the camper is supported by the trailing support assembly.

The hitching of the trailing support assembly at the rear portion of the self-propelled vehicle is such that it prevents the trailing support assembly from laterally shifting and pivoting with respect to the rear of the self-propelled vehicle. In short, the hitch serves to cause the trailing support assembly to behave more or less as an integral part of the rear of the self-propelled vehicle, at least to the extent of being laterally shifted with the rear of the self-propelled vehicle in response to front wheel steering of the self-propelled vehicle.

The trailing support assembly is a wheeled assembly. That is, it is supported on wheels. Normally two wheels are used and these are spaced from each other and carried on stub axles mounted to be horizontally pivotable with respect to the assembly. The wheels are horizontally pivotable so as to follow through in a trailing turning movement opposite in direction to the turning direction of the front steering wheels of the self-propelled vehicle to which the trailing support assembly is affixed. The opposite turning movement of the support wheels on the trailing support assembly is proportional to the lateral shifting of the trailing support assembly with the rear of the self-propelled vehicle when the rear of the self-propelled vehicle is shifted as a corner is turned. For example, the front wheels of the self-propelled vehicle will be turned to the right to traverse a right turn; but the support wheels of the trailing support assembly will turn to the left during negotiation of a right turn.

Another feature of the trailing support assembly is that it, quite separate from its hitching or other means to affix it to the self-propelled vehicle, has means to bias its support wheels toward a tracking non-pivoted relationship, or a parallelly aligned relationship, with the rear wheels of the self-propelled vehicle. This biasing means is such that the support wheels for the trailing support assembly are maintained in tracking parallel relationship to the rear wheels of the self-propelled vehicle when the self-propelled vehicle is following a straight path without turning. But this biasing means is also characterized by the feature that it causes increasing bias against horizontal pivoting action of the support wheels as the support wheels of the trailing support assembly are more and more turned or pivoted in a horizontal plane during turning action of the self-propelled vehicle.

It will be appreciated that one of the primary benefits of the present invention is that of relieving an ordinary automobile or pickup styled vehicle from carrying all of the weight of a camper housing while at the same time keeping the benefits of maneuvering flexibility that one enjoys when using a vehicle mounted camper instead of a camper on a trailer pivotally attached to the rear of a vehicle. Whenever a separate trailer-mounted camper is used, maneuverability in traffic as well as in backing up and turning around becomes a problem. Further, a separate trailer-mounted camper or analogous assembly presents problems in towing because of possible side-swaggering.

Another benefit of the invention is that the average self-propelled vehicle when used in the manner taught herein need not be modified by the substitution of stronger springs and shock absorbers to carry the heavy weight associated with a camper housing. Specifically, it has frequently been necessary heretofore to replace the standard factory-supplied rear springs and shock absorbers of pick-up styled vehicles with new heavy duty springs and shock absorbers so as to make the pickup styled vehicles capable of properly carrying the extra weight load of the average camper. This modification of springs and shock absorbers is no longer necessary when the teachings hereof are used.

Another benefit provided by the instant invention is that of a new style of camper assembly with the camper housing partially supported on an ordinary vehicle and partially supported on a trailing support assembly.

Another improvement provided by the invention is new means for positive turn control of the support wheels of a trailing support assembly, with hydraulic assistance being preferred.

Still additional benefits and improvements provided by this invention, and advantages resulting from the use of this invention, will become evident as this description proceeds.

Preliminarily, some statements as to what this invention is not about will now be made in order to focus attention more accurately on the principles of the invention and illustrate indeed that it is distinct from anything heretofore known.

First, the trailing support assembly of this invention is not a trailer member or truck member hitched or attached to a towing vehicle to swing laterally in pendulum fashion from the point of attachment (see U.S. Patent No. 2,070,832 or U.S. Patent No. 3,051,506). It is not one having an axle which itself shifts laterally in a horizontal plane and thereby causes tie-rod connected wheels affixed to its ends to assume a turning position with respect to the towing vehicle (see U.S. Patent 2,985,251). It is not one (as in U.S. Patent No. 2,553,553, or U.S. Patent 2,592,495) which relies upon a double connection to a towing vehicle plus lateral swinging in a pendulum fashion from a point of towing attachment to effect turning of tie-rod connected horizontally pivotable wheels at the ends of an axle carrying the same.

What this invention is will be described further by reference to a drawing, made a part hereof, wherein:

FIGURE 4 is a broken view of the undercarriage elements of the apparatus shown in FIGURE 1;

FIGURE 8 is a diagrammatic view of an electrical circuit and associated elements for the alternate embodiment illustrated in FIGURES 5 to 8.

Figure 1:
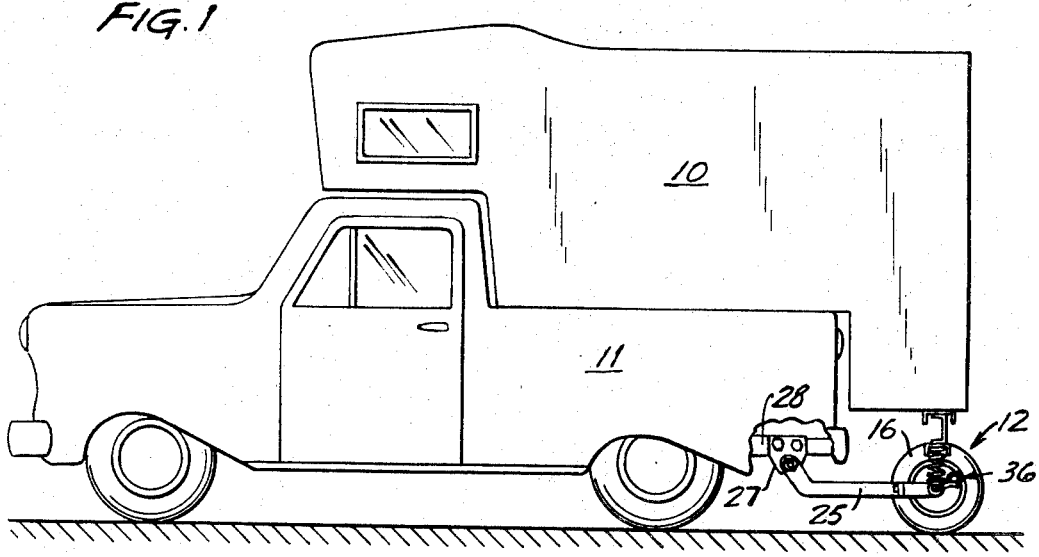
FIGURE 1 is a side elevation, partially broken away at the lower rear thereof, showing a camper housing supported at its front end on a pickup styled vehicle and supported at its rear end on a trailing support assembly in accordance with this invention.

Referring now to the drawings, a camper housing 10 is shown mounted on a pickup styled vehicle and partially supported thereby as well as partially supported by a trailing support assembly 12. The camper housing 10 may be of any varied form to suit one's taste. Illustratively, it will contain accommodations for sleeping, such as mattresses and bunks or beds. Also, it may contain some kitchen equipment, normally a stove, refrigerator and sink, plus closets and cupboards for storage. Frequently the better camper housings are equipped with reservoir space for water, fuel, waste and possibly electrical batteries for any optional electrical apparatus. Normally camper 10 for a pickup styled vehicle will be more or less as illustrated in FIGURE 1 of the drawings, whereas a camper 13 for an automobile vehicle 14 with a trailing support assembly 15 (as illlustrated in FIGURE 6) will be styled more or less along the lines illustrated schematically in FIGURE 6.

Figure 6:
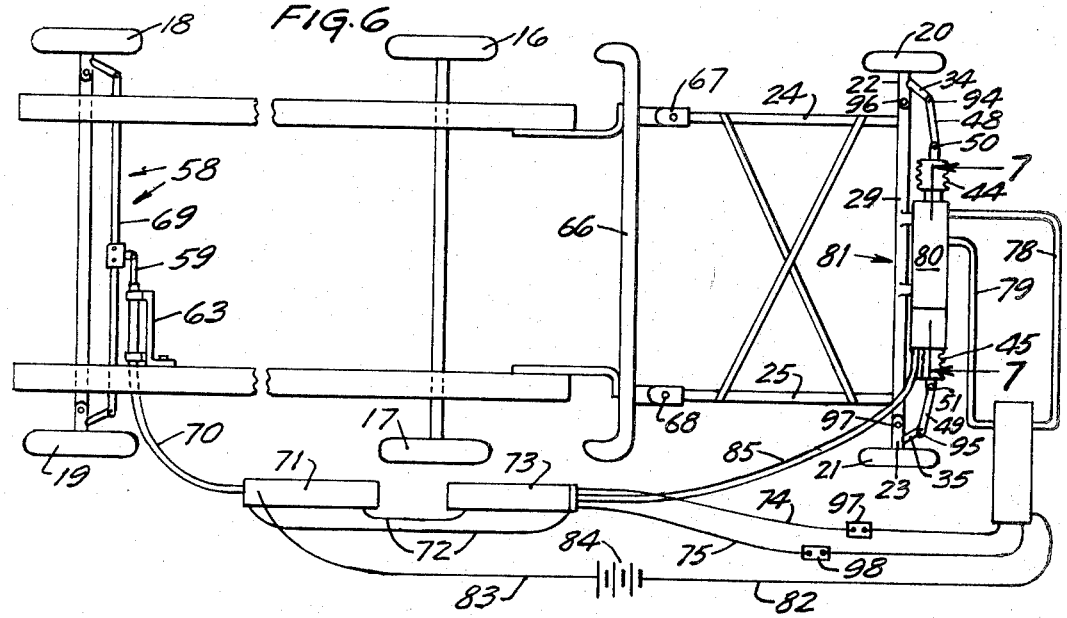
FIGURE 6 is a broken view of the undercarriage of the apparatus shown in FIGURE 5, with additional elements shown in schematic relationship.

The self-propelled vehicle 11 in FIGURE 1 and 14 in FIGURE 6 is one normally having four wheels. The two rear wheels 16 and 17 are nonsteerable or nonturning (except in rotation). They rotate on their mounting on the rear axle of the vehicle, whereas the front two wheels 18 and 19 normally turn in a horizontal direction with respect to the vehicle and are used in steering the self-propelled vehicle. One might call the self-propelled vehicle 11 or 14 a "towing vehicle"; however, this designation is misleading inasmuch as the self-propelled vehicle also serves as a partial support for the camper housing (10 in FIGURE 1 and 13 in FIGURE 6). The vehicle supports the front part of the camper housing. Thus the self-propelled vehicle is a carrying vehicle and not a mere towing vehicle.

Referring now to FIGURES 1 through 4, inclusive, the trailing support assembly of the invention will be described in detail. This trailing support assembly includes two support wheels 20 and 21 laterally spaced from each other and carried on stub axles 22 and 23. Each of these stub axles 22 and 23 is so mounted on the trailing support assembly as to be horizontally pivotable with respect to the assembly. The horizontally pivotable action is necessary for follow through trailing turning movement of the support wheels 20 and 21 when the front steering wheels of the self-propelled vehicle are turned. The turning movement of the support wheels 20 and 21, however, is opposite in direction from the turning direction of the front steering wheels 18 and 19 of the self-propelled vehicle. Specifically, when the front wheels 18 and 19 of the self-propelled vehicle are turned to the right to negotiate a right turn, the support wheels 20 and 21 turn to the left for the negotiation of that right turn. This is because the portion of the self-propelled vehicle behind the rear wheels 16 and 17, plus the trailing support assembly 12, tend to move in an opposite direction to the front end of the self-propelled vehicle (the portion in front of the rear wheels 16 and 17) when the vehicle is negotiating a turn. The extent of the opposite turning movement of the support wheels 20 and 21 (opposite in direction to the front wheels) is in proportion to the lateral shifting of the trailing support assembly 12 with the rear of the self-propelled vehicle. Again it is emphasized that the rear of the self-propelled vehicle (behind rear wheels 16 and 17) will move in a direction opposite to the front end of the self-propelled vehicle (in front of rear wheels 16 and 17) as the front wheels of the self-propelled vehicle are turned to negotiate a curve. Of course, the extent of opposite turning movement of the support wheels of the trailing support assembly is in proportion to the lateral shifting of that trailing support assembly with the rear of the self-propelled vehicle as caused by the extent of the turning of the front wheels of the self-propelled vehicle during steering. It should be recognized at this point that, where the distance of support wheels 20 and 21 from rear wheels 16 and 17 is equal to the distance of front wheels 18 and 19 from rear wheels 16 and 17, the extent of the opposite turning movement for support wheels 20 and 21 as compared to the turning movement of steering wheels 18 and 19 will be essentially equal but opposite. Where, however, the distance of support wheels 20 and 21 from rear wheels 16 and 17 is less than the distance of steering wheels 18 and 19 from rear wheels 16 and 17, the extent of the turning movement for support wheels 20 and 21 will be less than and opposite to the turning movement for steering wheels 18 and 19.

The trailing support assembly 12 also characteristically must have means to hitch or affix it to the rear portion of the self-propelled vehicle 11 so that the trailing support assembly is protected against lateral shifting with respect to the rear end of the self-propelled vehicle. In effect, the hitching is accomplished so that the trailing support assembly behaves substantially as an integral part of the rear of the self-propelled vehicle to the extent of being laterally shifted with the rear of the self-propelled vehicle in response to front wheel steering of the self-propelled vehicle. Normally at least two laterally spaced hitching or attaching members 24 and 25 connect to a member or members 26 and 27 on the rear of the self-propelled vehicle. As illustrated in FIGURES 1 and 4, the hitching elements may comprise arms 24 and 25 attached through nuts or bolts to a bracket 26 and 27 off of the frame 28 of the self-propelled vehicle. Suitably, the hitching may be accomplished to the bumper of the self-propelled vehicle; but hitching is accomplished preferably from an axle 29 or equivalent component or components carrying or supporting the stub axles 22 and 23 for the support wheels 20 and 21. Of course either the frame or the suspended body of the self-propelled vehicle may be employed as a base member to which the trailing support assembly 12 is hitched or detachably affixed. To reduce jarring action and permit some slight movement (particularly vertical movement) of the trailing support assembly with respect to the body of the self-propelled vehicle, it is suitable and even desirable to connect the laterally spaced hitching elements 24 and 25 of the trailing support assembly 12 to the axle 29 of the trailing support assembly by means of a shock absorbing connection. A suitable shock absorbing connection is one having rubber elements 30 and 31 between an arm 32 and 33 off of the axle 29 and the laterally spaced hitching elements 24 and 25.

It should be noted that axle bar 29, or an equivalent member or members, extends between the stub axles 22 and 23 for the trailing support wheels 20 and 21. Axle bar 29 may assume a variety of shapes; and indeed the axle bar itself may be united with other components or be entirely lacking in the design structural sense except that its basic function must inherently be provided by other elements in that the trailing support wheels 20 and 21 must be spaced and mounted to perform as taught herein.

Both of the support wheels 20 and 21 of the trailing support assembly 12 are biased to track in nonpivoted relationship or a relationship parallel to the nonturning rear wheels 16 and 17 of the self-propelled vehicle. The biasing means is entirely separate from the hitching means of the trailing support assembly.

This biasing means will be described in detail by reference to FIGURES 2, 3 and 4. Each stub axle 22 and 23 is equipped with a knuckle radius arm 34 and 35. Between these radius arms extends a tie rod arrangement 36. A preferred means to bias the support wheels 20 and 21 toward and in a tracking nonpivoted relationship parallel to the nonhorizontally-turning rear wheels of the self-propelled vehicle is one having a spring member 37 (or possibly separate spring members, one or more for each support wheel). Suitably the spring member 37 is a coil spring about a central rod 38 of the tie rod arrangement 36. At each end of the coil spring is an abutment washer 39 and 40 which floats on central rod 38 of the tie rod arrangement 36. The floating action of washers 39 and 40, however, is limited. Each washer 39 and 40 is always in abutting relationship to coil spring 37. But when central rod 38 of the tie rod arrangement 36 moves to the left, a seal ring 41 in an annular groove in rod 38 abuts against washer 39 and causes washer 39 to move to the left with the movement of central rod 38. This action compresses spring 37 between washers 39 and 40 because washer 40, in the just noted movement, remains in the position illustrated in FIGURE 3. Specifically, washer 40 is held in position against leftward movement by flange 89 extending inwardly of spring housing 43. Conversely, when central rod 38 of the tie rod assembly 36 moves to the right, seal ring 42 (also in an annular groove in rod 38) presses against washer 40 and moves it along with the movement of central rod 38 to compress coil spring 37 between washers 39 and 40, with washer 39 remaining in the position illustrated in FIGURE 3 because of abutment flange 88 extending inwardly from housing 43. Of course, the coil spring 37, washers 39 and 40, and seal rings or pins 41 and 42 are, when the spring 37 is in non-compressed condition, as illustrated in FIGURE 3, contained within a housing member 43 which is fixed to a stationary of the trailing support assembly such as axle member 29 by any suitable means such as bolted stubs as illustrated in FIGURE 4. At each end of the biasing assembly which comprises the coil spring 37 and the other elements in the housing 43 is a flexible dirt-protecting sheath 44 and 45 such as a flexible rubber corrugated sheath. The corrugated flexible rubber sheath 44 and 45 suitably extends along central tie rod 38 sufficiently to protect the portion of that central tie rod 38 which passes through journal members 46 and 47 at each end of the biasing housing 43. Here it should be recognized that sufficient space is located in the biasing housing 43 to permit the ring seals 41 and 42 on tie rod central shaft 38 to move within the biasing housing 43 during all expected turning moments for support wheels 20 and 21.

Suitably the tie rod assembly 36 is divided to have end tie rod members 48 and 49 connected to central tie rod member 38 through horizontal pivot or universal joints 50 and 51.

As will be evident from the just noted description, the ring seals 41 and 42 acting against washers 39 and 40 about central tie rod 38 tend to be maintained in the position illustrated in FIGURE 3 by the coil spring 37. This in turn tends to maintain the rod 38 in the noted position and the support wheels 20 and 21 in the trailing or tracking non-pivoted relationship illustrated in FIGURE 4, which is parallel to the non-turning rear wheels of the self-propelled vehicle. This biasing action is such that the support wheels 20 and 21 are maintained in the tracking non-pivoted parallel relationship to the rear wheels of the self-propelled vehicle when the self-propelled vehicle is following a straight path without turning. But this biasing action feature is such that any pivoting of the support wheels 20 and 21 in a horizontal plane is accompanied by increasing bias against such pivoting action as the extent of the pivoting of the support wheels becomes greater. In other words, the greater the compression of spring 37 as a result of central tie rod 38 moving in either direction from normal as illustrated in FIGURE 3, the greater the force exerted by spring 37 against washers 39 and 40 to force those washers back into the relationship they have as illustrated in FIGURE 3.

Figure 2:
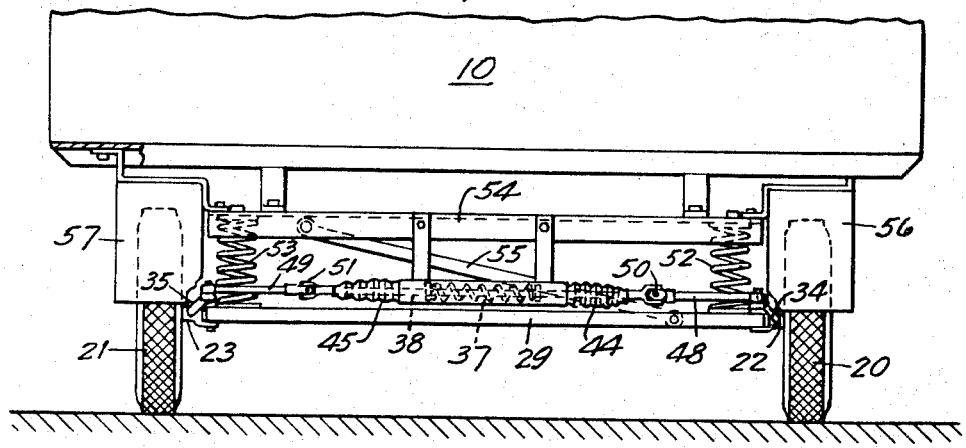
FIGURE 2 is a schematic rear view of the rear of the camper housing and the trailer support assembly of FIGURE 1.
Figure 3:
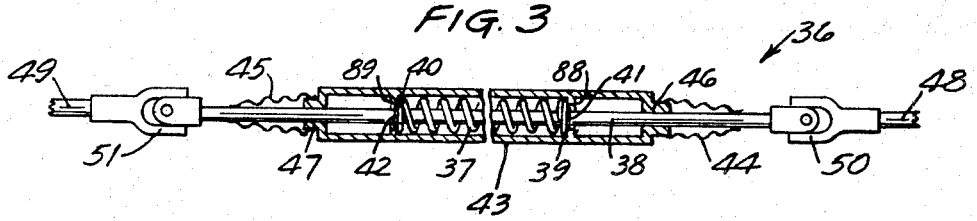
FIGURE 3 is an enlarged rear view partially in section showing the biasing means in the tie-rod apparatus of the trailing support assembly of FIGURES 1 and 2.

A preferred means for mounting the trailing support assembly to the rear bottom portion of a camper housing is one such as illustrated in FIGURE 2. As there illustrated, coil suspension springs 52 and 53 extend between the axle 29 and a plate member 54 rigidly fixed to the camper housing 10 by bolted brackets or any other suitable means. Plate member 54 suitably extends in the direction of the axle 29 between wheels 20 and 21; and in the case of employing coil suspension springs 52 and 53, it is preferable to additionally employ a stabilizer bar 55 or other stabilizer means between plate 54 and axle rod 29. If desired, fenders 56 and 57 may be attached to elements from the camper housing over each of the support wheels 20 and 21.

It is a rather surprising phenomenon that the support wheels 20 and 21 in the trailing support assembly just described will turn as the vehicle to which the trailing support assembly is attached is turned even though no affirmative turning connection extends between the front turning assembly 58 of the self-propelled vehicle and the support wheels 20 and 21 of the trailing support assembly 12. It appears that the mere lateral shifting of the trailing support assembly as a unit with the rear portion of the self-propelled vehicle (the portion of the self-propelled vehicle behind rear wheels 16 and 17), which occurs when the front wheels 18 and 19 of the self-propelled vehicle are turned in negotiating a curve or the like, is quite sufficient—in combination with the road surface on which the support wheels 20 and 21 are moving—to cause the wheels 20 and 21 to appropriately turn in negotiating a curve or turning action for the complete camper arrangement. In effect, the friction between the wheels 20 and 21 and the road surface on which the camper assembly is traveling is sufficient to cause the wheels 20 and 21 to take the path of least resistance and appropriately turn in an opposite direction to the turning wheels 18 and 19 of the self-propelled vehicle during negotiation of the curve. This feature has been thoroughly tested and it has been found unnecessary to employ any affirmative steering connection between the steering means for the self-propelled vehicle and the trailing support assembly. While tests have established this conclusion to be particularly valid where the support wheels 20 and 21 are smaller in diameter than the rear wheels 16 and 17 of the self-propelled vehicle, it is believed the phenomenon would be also valid even where support wheels 20 and 21 as large or even slightly larger than the diameter of the rear wheels 16 and 17 of the self-propelled vehicle are used. Preferably, however, the support wheels are smaller in diameter as illustrated.

In FIGURE 4, however, there is also illustrated a connection between the steering assembly 58 of the self-propelled vehicle and the turning mechanism (tie rod arrangement or assembly 36, radius arms 34 and 35 and stub axles 22 and 23) of the trailing support assembly 12. As there illustrated, the connection between the steering assembly 58 of the self-propelled vehicle may comprise an arm member 59 off of a central tie rod 60 of the steering mechanism, plus an arm 61 off of a suitable knuckle radius arm 35, and a flexible cable 62 connecting between arms 59 and 61 to transmit steering movement from the front steering assembly 58 to the turning assembly of the trailing support assembly. Suitably each arm 59 and 61 extends into an essentially horizontally mounted journal casing or sleeve 63 and 64 respectively. Each journal casing or sleeve 63 and 64 is suitably mounted on elements nearby. For example, sleeve 63 may be bracket mounted to the frame of the self-propelled vehicle to permit some lateral swinging. Likewise sleeve 64 is suitably bracket mounted on the axle or member off the axle 29 to permit some lateral swinging or pivot shifting as the arm 61 is shifted during turning movements of the tie rod arrangement 36. In the sleeves 63 and 64 the connection between the cable 62 and arms 59 and 61 respectively is made. Further cable 62, while not emphasized in the illustration in FIGURE 4 of the drawing, is held within a tube member such that longitudinal movement of the cable is reasonably accurately transmitted from the arm 59 out of sleeve 63 to arm 61 out of sleeve 64, and thereby transmitted to knuckle radius arm 35 to effect turning of support wheels 20 and 21 in a proportionate degree as necessary to aid the proper turning for a tracking of support wheels 20 and 21 about a corner when the self-propelled vehicle is turned to go around a corner. In essence, this arrangement provides positive turning action to the support wheels 20 and 21 of the trailing support assembly, with the positive action being transmitted from the steering arrangement 58 of the self-propelled vehicle.

A further embodiment of the invention, with particular emphasis on an alternative preferred positive control for the turning action on support wheels 20 and 21 of the trailing support assembly is illustrated in FIGURES 5 to 8, inclusive. For convenience in recognition, where elements in the embodiment in FIGURES 5 through 8, inclusive, are the same or substantially the same as comparable elements in the embodiment of FIGURES 1 through 4, inclusive, an effort has been made to employ the same numbers in designating the elements. Specifically, rear wheels 16 and 17 as well as front wheels 18 and 19 of the vehicle 14 are comparable in character and function to the same respective elements in vehicle 11 of FIGURES 1 to 4.

The embodiment of FIGURES 5 through 8, inclusive, however, specifically illustrates the hitching of a trailing support assembly 15 to the bumper 66 of the self-propelled vehicle 14. The hitching elements 24 and 25 in FIGURE 6 are illustrated as mere rod members extending to conventional ball joint trailer hitch cooperating elements 67 and 68. Rods 24 and 25 suitably extend to the axle rod 29 of the trailing support assembly in FIGURE 6. Observe that the spring action of the suspension springs for the vehicle 14 are relied upon to absorb shock or verticle changes in relationship between the support assembly 15 and the vehicle wheels.

In FIGURE 6 there is also shown schematically the essential elements for imparting positive turning action to the support wheels 20 and 21 of the trailing support assembly. Broadly speaking, the positive turning action of support wheels 20 and 21 is accomplished by the transmission of steering motion from the tie rod 69 between front wheels 18 and 19 of the self-propelled vehicle through a flexible drive cable 70 into a translator 71 where the longtiudinal movement of the flexible drive cable 70 is translated into electrical data. Electrical data from translator 71 is transmitted through multiple wires 72 (schematically illustrated in FIGURE 6 and also in FIGURE 8) to a translator 73 located in the camper housing 13, preferably in or near the floor of the camper housing 13. The electrical data received by translator 73 is transmitted through conductors 74 and 75 to a reversible electrical motor 76 which operates a pump 77 for a hydraulic fluid. Hydraulic fluid from pump 77 passes through lines 78 or 79 into a hydraulic piston chamber in housing 80 to effect movement of the tie rod assembly, broadly designated at 81, and positive steering action of the support wheels 20 and 21. Electrical conductors 82 and 83 shown in FIGURE 6 supply electrical power suitably from a battery 84 to the translator 71 and 73 as well as the electrical motor 76. A cable 85 from the tie rod arrangement 81 of the trailing support assembly feeds back the movement of the tie rod to the translator 73, whereby the operation of the electrical motor 76 is stopped. The motor 76 is stopped when the movement of the tie rod elements in tie rod arrangement 81 reflects the amount of turning required for support wheels 20 and 21 in response to the amount of turning imparted to steering wheels 18 and 19 when negotiating a curve or corner.

Figure 7:
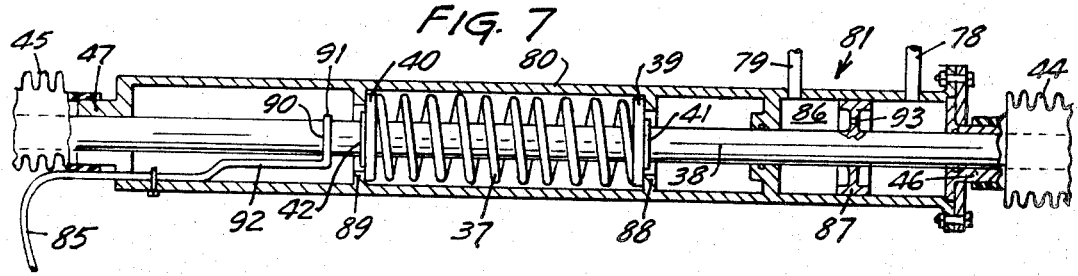
FIGURE 7 is a broken schematic view in section taken on line 7—7 of FIGURE 6.

In FIGURE 7 the hydraulic piston chamber 86 in housing 80, as well as other elements of the tie rod arrangement, are schematically shown with parts broken away for clarity. The central rod 38 of the tie rod arrangement 81 extends through the housing 80. At one end of the housing 80 is a common piston chamber 86 with a piston 87 affixed to central rod 38 and centrally located in the piston chamber 86 when the support wheels 20 and 21 are in relaxed biased condition parallel with rear wheels 16 and 17 of the self-propelled vehicle. When hydraulic pump 77 forces hydraulic fluid through conduit 78 into chamber 86, piston 87 moves to the left in FIGURE 7 and hydraulic fluid passes out of chamber 86 through conduit 79 to the pump 77. Conversely, flow of hydraulic fluid from pump 77 through conduit 79 into chamber 86 forces piston 87 to the right in FIGURE 7 and hydraulic fluid out through conduit 78 to pump 77. Suitably a reservoir (not shown) may be incorporated in the hydraulic system in a known manner for hydraulic systems. As piston 87 moves to the right or left in chamber 86, central rod 38 of the tie rod arrangement 81 moves along with the piston 87.

At the left in housing 80 in FIGURE 7 is located a coil biasing spring 37 about central rod 38. This operates in essentially the same way as the arrangement shown in FIGURE 3. At each end of biasing spring 37 is a washer 39 and 40. Each washer is limited in movement outwardly from biasing spring 37 by an abutment flange 88 and 89 extending inwardly from the interior of housing 80. Further, ring seals 41 and 42 at the exterior of each washer 39 and 40 prevent washer 39 and 40 respectively from moving along rod 38 beyond the location of the ring seal associated with the washer. Thus when piston 87 is forced to the left by hydraulic fluid in piston chamber 86, ring seal 41 carries washer 39 to the left compressing spring 37 against washer 40 which is held in the position shown in FIGURE 7 by the abutment flange 89 extending inwardly from housing 80. Conversely, when hydraulic fluid forces piston 87 to the right in FIGURE 7, ring seal 42 carries washer 40 along with the movement of rod 38 to the right, thereby compressing spring 37 against washer 39 held in the position shown in FIGURE 7 by abutment flange 88 extending inwardly from housing 80.

The center rod 38 has an annular groove 90 in it at some location, suitably, as illustrated in FIGURE 7, at the extreme left or longitudinally spaced along rod 38. A Y-forked or bifurcated member 91 fits upwardly into the annular groove with its forked members resting in the groove. Member 91 extends downwardly from its forked ends and then parallel with tie rod member 38 for a distance as a slide rod 92. To slide rod 92 is connected the flexible cable 85 (see also FIGURE 6) leading to translator or controller 73. Again it is emphasized that movement of shaft rod 38 of tie rod assembly or arrangement 81 will be transmitted through forked member 91 and slide rod 92 and flexible cable 85 to the translator 73.

As will be evident from the relationships discussed, the tie rod assembly 81 also is equipped with journaled surfaces 46 and 47 at the ends of housing 80 through which rod 38 slides during turning movement of the support wheels 20 and 21 of the trailing support assembly. Preferably, the piston 87 in chamber 86 is provided with a leak port 93 so that the biasing action of the spring 37 is rendered more effective under all conditions; however, a leak port is not essential since the spring biasing action is exhibited even when under hydraulic influence.

As illustrated in FIGURE 6, rods 48 and 49 connected through universal joints 50 and 51 transmit motion from tie rod 38 to radius arms 34 and 35 and stub axles 22 and 23 to support wheels 20 and 21, and vice versa. Of course, rods 48 and 49 are connected to radius arms 34 and 35 by a horizontally pivotable joint 94 and 95, and stub axles 22 and 23 are connected to axle 29 through a horizontally pivotable joint 96 and 97.

If desired, the multiple electrical conduits 72 between translator 71 and translator 72 may be split and made plug connectable so that the conduits 72 into the translator 73 may be conveniently disconnected from the conduits 72 into translator 71 when the trailing support assembly and camper housing are detachable from the self-propelled vehicle. Such is particularly desirable when translator 71 is located under the hood or in the passenger compartment of the self-propelled vehicle and translator 73 is located in the floor or a portion of the camper housing. However, it is also possible to position both translators in the camper housing 13. Then the flexible cable 70 is split and fitted with detachable connectors (not shown) for disconnection when the trailing support assembly 15 and the camper housing 13 are detached from the vehicle 14.

Figure 5:
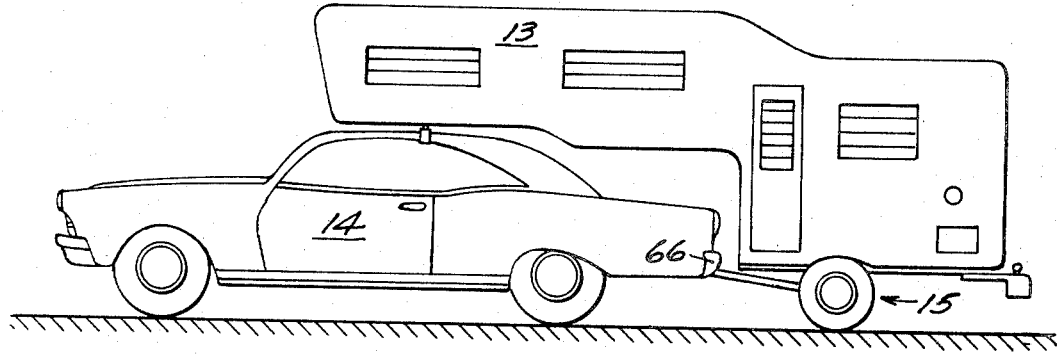
FIGURE 5 is a side elevation of an alternate embodiment of the invention.

Suitably, as illustrated in FIGURE 6, relays 97 and 98 may be interposed in the electrical conduits from translator 73 to motor 76 so as to obviate pulse electrical impulses; and the reasons for this will become evident in describing the electrical circuitry by reference to the schematic view of FIGURE 5.

As illustrated in FIGURE 8, the flexible cable 70 extends through an opening in the end of translator 71 into a longitudinal center cavity of electrical insulator bar 99. The cable 70 may in fact be connected to a rod 100 which passes into the central cavity of bar 99. At the end of the cable or rod 100, inside the central cavity, is attached in electrically insulative fashion a contact-carrying block plunger 101 which is capable of longitudinal movement as drawn or pushed by rod 100 in the longitudinal cavity of block 99. One electrical contact 102 (or leaf spring) on the contact-carrying block 101 remains continuously in sliding electrical contact with a contact bar 103 on one side of the longitudinal cavity in bar 99. Another electrical contact 104 (likewise suitably leaf spring in character) is on block 101 and is in continuous electrical connection with contact 102 on block 101. Electrical contact 104 rides over a plurality of electrical contact plates or terminals 105 on another side of the cavity in bar 99 as the block 101 is moved longitudinally in its cavity. To each terminal 105 is connected an electrical conduit line 72.

Lines 72 from terminals 105 are illustrated as proceeding to a single line conductor 106 and then to a plurality of lines 72 leading into contact plates or terminals 107 in translator 73. It should be appreciated that this is done for the sake of simplicity only. In practice a line such as line 72–1 from terminal 105–1 in bar 99 of translator 71 extends electrically independently of the other lines between translator 71 to translator 73 and then connects with its terminal 107–1 in translator 73. Each line 72 then extends from its terminal 105 in translator 71 to its terminal 107 in translator 73 in an effectively electrically independent fashion from other lines 72.

For purpose of illustration, the number of lines 72 between translator 71 and translator 73 has also been reduced greatly so as to permit clarity in the drawing. A hundred or even more lines 72 may extend between the translators 71 and 73, the number being dependent on the smoothness one desires for positive turning control of the support wheels 20 and 21.

In translator 73 is another longitudinal cavity or slide guide. Within the cavity of the insulator block 108 of translator 73 is a contact-carrying block plunger 109. Side contacts 110 and 111 on the block 108 are at least so spaced from each other sufficiently to cause each contact 110 and 111 to be free of electrical contact to one terminal 107 when the block 109 is so positioned in the longitudinal cavity of insulator bar 108 as to have one terminal 107 centrally located between contacts 110 and 111. However contacts 110 and 111 each preferably are of sufficient size to engage in electrical contact with two or three (or possibly even as many as 5 or 6) terminals 107. The reason for this will become evident from the description to follow.

One contact 110 on block 109 is in continuous electrical connection with a sliding electrical contact 112 on block 109; and contact 112 rides or slides in continuous electrical contact with electrically conductive bar 113 on one side of the cavity in bar 108 (one a side of the cavity free of terminals 107). The other electrical sliding contact 111 on block 109 is in continuous electrical connection through block 109 to sliding electrical contact 114 on block 109. Contact 114 rides or slides in continuous electrical contact with electrically conductive bar 115 also on one side of the cavity in bar 108 free of the terminals 107.

Block 109 of translator 73 is connected to a rod 116 to which flexible cable 85 is in turn connected. Rod 116 extends through an end of insulator bar 108 into the cavity therein to connect in insulative fashion with block 109. As rod 116 is pushed back and forth by cable 85, block 109 traverses over the terminals 107.

Each conductive bar 113 and 115 connects electrically with motor 76, with one connection (e.g., line 74) for clockwise rotation of motor 76 (and pump 77) and the other connection (e.g., line 75) for counterclockwise rotation of motor 76.

As will be evident, the flexible cables 70 and 85 should be surrounded by conduit wall, at least intermittently along the length of the cables and at curves in the cables, so as to cause them to accurately transmit the degree of longitudinal movement imparted to them. This feature is clear without illustration in the drawings.

In operation as steering wheels 18 and 19 are turned to the right to negotiate a right turn, the motion imparted to cable 70 is to the left and toward translator 71. This causes the block 101 in translator 71 to move to the left in FIGURE 8. Electrical energy from battery 84 passes through line 83 to conductor bar 103 through contact 102 and contact 104 to line 72–1 (and continued right turn of wheels 18 and 19 will cause lines 72–2, 72–3, and others to be sequentially energized with electricity). Next, electrical energy passes through line 72–1 to terminal 107–1 at the left of terminal 107–0 in translator 73. At terminal 107–1 in translator 73, the energy passes through contact 110 on block 109 and thence through contact 112, conductor bar 113 and line 74 to motor 76. Motor 76 then rotates, suitably in a clockwise direction, and causes pump 77 to pump hydraulic fluid through hydraulic conduit 79 into chamber 86, forcing piston 87 to the right in FIGURE 7. This in turn causes shaft 38 of the tie rod assembly to move to the right in FIGURE 7 (and upwards in FIGURE 6). The result is that support wheels 20 and 21 turn to the left for negotiation of the right turn of the camper assembly. Also, as this happens fork 91 in annular groove 90 of tie rod member 38 is drawn to the right in FIGURE 7 (and upwards in FIGURE 6). Similar movement is imparted to slide rod 92 off of fork 91 as well as to flexible cable 85. The result is that flexible cable 85 is moved longitudinally away from translator 73. This pulls the block 109 in the cavity of translator 73 to the left in FIGURE 8; and the flow of electrical current to motor 76 is cut off when the flexible cable 85 draws the block 109 sufficiently to the left to cause terminal 107–1 to be in a position between contacts 110 and 111 on block 109. Of course, if the front wheels 18 and 19 are turned greatly, more than one (and actually several) of the terminals 107 will sequentially be energized. But block 109 is drawn along by the action of the tie rod member 38 as a response to the operation of the hydraulic pump 77. When the maximum extent of turning has been translated back into translator 73, the block 109 of that translator will have its contacts 110 and 111 located on each side of farthest terminal 107 which was energized. In such condition, with the energized terminal 107 in translator 73 in neutral position, energy to motor 76 is cut off and the action of the hydraulic pump 77 is suspended. Reverse turning of front wheels 18 and 19 causes reverse movements within the translators 71 and 73 and reverse operation of motor 76 and pump 77.

At neutral, the terminal 107-0 in translator 73 is energized, but it is located between contacts 110 and 111 because of the positioning caused by cable 85. Thus the electrical motor 76 and hydraulic pump are suspended or inactive at neutral.

Where the distance from support wheels 20 and 21 to rear wheels 16 and 17 is less than the distance from front wheels 18 and 19 to the rear wheels 16 and 17, the spacing between terminals 107 in translator 73 will be commensurately reduced as compared to their respective counterparts terminals 105 in translator 71. Thus the distance traversed by plunger block 109 in translator 73 will be less than the distance traversed by plunger block 101 in translator 71 during any steering movement of the vehicle. This in turn is reflected in the turning of the support wheels 20 and 21, which is less than the turning of the steering wheels 18 and 19 under the noted conditions. Where the wheel distances are the reverse of those just noted, the spacing of terminals in the translator will be changed to the opposite of the spacing just noted under the above assumed condition of wheel spacing.

Where contacts 110 and 111 are large enough to each engage with several terminals 107, even great speed of turning movement of front wheels 18 and 19 will be always picked up by the contacts 110 and 111 and translated into motor operation for the hydraulic pump 77.

It is preferred that the connection between hitching arms 24 and 25 of the trailing support assembly and the vehicle frame 28 in FIGURE 4 is a vertically pivotable connection so that vertical ride movement of the vehicle is not directly transmitted to the trailing support assembly.

Biasing means to maintain the support wheels 20 and 21 in the tracking condition hereinabove described is essential to the operation of the trailing support assembly in the manner described. Biasing is not accomplished by the mere use of such principles as camber caster and toe-in for the support wheels, although such principles may advantageously be additionally employed. Thus, biasing other than mere camber caster and toe-in is employed.

As will be evident to those skilled in the art, the invention may be varied from the specific embodiments illustrated and described without departing from the essential features as recited and discussed herein.

I claim:
1. A trailing support assembly adapted to be affixed to the rear of a self-propelled vehicle having front wheels for steering movement and rear wheels which do not pivot for steering, comprising (1) means to hitch said support assembly to the rear portion of a self-propelled vehicle so as to behave substantially as an integral part of the rear of said self-propelled vehicle to the extent of being laterally shifted with the rear of the self-propelled vehicle in response to steering movement of the self-propelled vehicle, (2) two support wheels laterally spaced from each other and carried on stub axles connected by a tie rod arrangement, said stub axles being mounted upon said assembly so as to be horizontally pivotable with respect to said assembly for follow through trailing turning movement of said support wheels in a direction opposite to the turning direction of the front steering wheels of the vehicle, the extent of said opposite turning movement of said support wheels being in proportion to the lateral shifting of the trailing support assembly with the rear of the self-propelled vehicle as caused by the extent of turning of the front wheels of the self-propelled vehicle during steering, (3) a spring means free of spring contact with hydraulically moved fluid and separate from said hitching means, said spring means being adapted to bias said two laterally-spaced support wheels toward a tracking nonpivoted relationship parallel to the nonpivoting rear wheels of the self-propelled vehicle, said spring biasing means being located upon said tie rod arrangement and being integral therewith such that said support wheels are maintained in tracking nonpivoted relationship to the rear wheels of the self-propelled vehicle when the self-propelled vehicle is following a straight path without turning, said spring biasing means further being such that any pivoting in a horizontal plane by said support wheels is accompanied by increasing bias against such pivoting action as the extent of said horizontal pivoting becomes greater, and (4) further spring means extending between said trailing support assembly and a plate member adapted to be affixed supportingly to a camper housing so as to support the camper housing and insulate the same from road shocks picked up by the support wheels of said trailing support assembly.

2. The trailing support assembly of claim 1 having, in addition, means for positively horizontally pivoting both the support wheels thereof in response to steering the front wheels of the self-propelled vehicle.

3. The trailing support assembly of claim 1 having, in addition, electrically activated hydraulic means for positively horizontally pivoting the support wheels thereof in response to steering the front wheels of the self-propelled vehicle.

4. A mobile camper apparatus comprising (a) a self-propelled four-wheeled vehicle having two nonhorizontally turnable rear wheels and two horizontally turnable front steering wheels turnable through a tie rod connection, (b) a trailing support assembly affixed to the rear of said self-propelled vehicle, (c) a camper housing supported at its front end by said self-propelled vehicle and supported at its rear end by said trailing support assembly, said trailing support assembly comprising (1) means fixing it to the rear portion of the self-propelled vehicle against lateral shifting and pivoting with respect to the rear of the self-propelled vehicle and so as to behave substantially as an integral part of the rear of said self-propelled vehicle to the extent of being laterally shifted with the rear of said self-propelled vehicle in response to front wheel steering thereof, (2) two support wheels laterally spaced from each other and carried on stub axles mounted to be horizontally pivotable with respect to said assembly for follow through trailing turning movement of said support wheels in a direction opposite to the turning direction of the front steering wheels of said vehicle, the extent of said opposite turning movement of said support wheels being in proportion to the lateral shifting of the trailing support assembly with the rear of the self-propelled vehicle as caused by the extent of turning of the front wheels of the self-propelled vehicle during steering, and (3) a spring means separate from said means fixing said trailing support assembly to the rear portion of the self-propelled vehicle for biasing said two support wheels toward a tracking nonpivoted relationship parallel to the nonpivoting rear wheels of the self-propelled vehicle, said spring biasing means being located upon a tie rod arrangement between mountings for said support wheels and being such that said support wheels are maintained in tracking nonpivoted relationship to the rear wheels of the self-propelled vehicle when the self-propelled vehicle is following a straight path without turning, and said biasing means further being such that any pivoting in the horizontal plane by the support wheels is accompanied by increasing bias against such pivoting action as the extent of said horizontal pivoting becomes greater, and (d) a spring means extending between said trailing support assembly and a plate member affixed supportingly to the rear portion of the camper housing, whereby the rear portion of said camper housing is supported and insulated from road shocks picked up by the support wheels of said trailing support assembly.

5. The mobile camper apparatus of claim 4 having, in addition, means for positively horizontally pivoting both the support wheels thereof in response to steering the front wheels of the self-propelled vehicle.

6. The mobile camper apparatus of claim 4 having, in addition, electrically activated hydraulic means for positively horizontally pivoting the support wheels thereof in response to steering the front wheels of the self-propelled vehicle.

7. The mobile camper apparatus of claim 4 having, in addition, an electrical translator of turning movements of steering as a part of the self-propelled vehicle and an electrically actuated motor and hydraulic system for positively actuating horizontal pivoting of the support wheels of the trailing support assembly in response to steering of the front wheels of the self-propelled vehicle.

8. A camper assembly comprising (a) a camper housing, (b) nonrolling means for stationary support of the front end of the camper housing while said front end is free of support of a self-propelled vehicle, said non-rolling means being adapted to be rendered inoperative when the front end of said camper housing is supported by a self-propelled vehicle, (c) a trailing support assembly adapted to be hitched to the rear of the self-propelled vehicle which serves as the support for the front end of the camper housing when the trailing support assembly is affixed to the rear of said self-propelled vehicle, said trailing support assembly comprising (1) means to hitch said support assembly to the rear portion of a self-propelled vehicle against lateral shifting and pivoting with respect to the rear of the self-propelled vehicle and so as to behave substantially as an integral part of the rear of said self-propelled vehicle to to extent of being laterally shifted with the rear of the self-propelled vehicle in response to front-wheel steering of the self-propelled vehicle, (2) two support wheels laterally spaced from each other and carried on stub axles mounted to be horizontally pivotable with respect to said assembly for follow through trailing turning movement of said support wheels in a direction opposite to the turning direction of the front steering wheels of the vehicle, the extent of said opposite turning movement of said support wheels being in proportion to the lateral shifting of the trailing support assembly with the rear of the self-propelled vehicle as caused by the extent of turning of the front wheels of the self-propelled vehicle during steering, and (3) a spring means separate from said hitching means to bias said two laterally-spaced support wheels toward a tracking nonpivoted relationship parallel to the nonpivoting rear wheels of the self-propelled vehicle, said spring biasing means being located upon a tie rod arrangement between mountings for said support wheels and being such that said support wheels are maintained in tracking nonpivoted relationship to the rear wheels of the self-propelled vehicle when the self-propelled vehicle is following a straight path without turning, and said biasing means further being such that any pivoting in a horizontal plane by said support wheels is accompanied by increasing bias against such pivoting action as the extent of said horizontal pivoting becomes greater, and (d) spring means extending between said trailing support assembly and a plate member affixed supportingly to the camper housing, whereby the camper housing is supported and insulated from road shocks picked up by the support wheels of said trailing support assembly.

9. The camper assembly of claim 8 having, in addition, means for positively horizontally pivoting both the support wheels thereof in response to steering the front wheels of the self-propelled vehicle.

References Cited

UNITED STATES PATENTS

| 3,097,863 | 7/1963 | Moore | 280—445 |
|---|---|---|---|
| 3,212,793 | 10/1965 | Pietroroia | 280—443 |
| 2,510,525 | 6/1950 | Smart | 280—443 |

FOREIGN PATENTS

| 1,224,028 | 2/1960 | France. |
|---|---|---|

PHILIP GOODMAN, *Primary Examiner.*